United States Patent [19]
Long et al.

[11] Patent Number: 6,045,268
[45] Date of Patent: Apr. 4, 2000

[54] BEARING LOCK CLIP FOR AN ELECTRIC MOTOR

[75] Inventors: Norman R. Long, Tipp City; Frank E. Staigl, III, Troy, both of Ohio

[73] Assignee: A. O. Smith Corporation, Milwaukee, Wis.

[21] Appl. No.: 09/187,219

[22] Filed: Nov. 6, 1998

[51] Int. Cl.[7] .................................................. F16C 43/04
[52] U.S. Cl. ............................................ 384/542; 384/537
[58] Field of Search .................................. 384/542, 537, 384/584, 585

[56] References Cited

U.S. PATENT DOCUMENTS

| | | | |
|---|---|---|---|
| 2,418,707 | 4/1947 | Groot | 286/7 |
| 2,704,693 | 3/1955 | Schwan | 384/519 |
| 2,772,929 | 12/1956 | Eastman | 384/542 |
| 2,891,829 | 6/1959 | Irvin | 384/542 |
| 3,391,291 | 7/1968 | Benson et al. | 310/90 |
| 3,518,471 | 6/1970 | Wightman et al. | 310/85 |
| 4,386,812 | 6/1983 | Anderson | 384/542 |
| 4,655,616 | 4/1987 | Ducan | 384/446 |
| 5,707,157 | 1/1998 | Pritchard et al. | 384/542 |

*Primary Examiner*—Thomas R. Hannon
*Attorney, Agent, or Firm*—Michael Best & Friedrich LLP

[57] ABSTRACT

A bearing lock clip for an electric motor is provided. A bearing lock clip is secured to an end frame of a motor and locks or unlocks a motor bearing in place in the end frame. The bearing lock clip is mounted for movement between a locked and an unlocked position. The bearing lock clip includes a tab which abuts an outside surface of the end frame. An attachment is provided to secure the lock clip to the end frame. As the attachment is rotated, the lock clip rotates until the tab abuts the outside surface of the end frame and, either, a part of the lock clip covers a part of the bearing, or no part of the lock clip covers any part of the bearing.

12 Claims, 4 Drawing Sheets

BEARING LOCK CLIP FOR AN ELECTRIC MOTOR

FIELD OF THE INVENTION

The present invention relates, generally, to electric motors which require locking a bearing into an end frame of a motor.

Specifically, the present invention concerns a bearing lock clip for such an electric motor.

BACKGROUND OF THE INVENTION

There are several prior art assemblies for locking bearings into a motor end frame, thus preventing axial movement of a motor shaft. Assemblies previously disclosed for this purpose include clamping a bearing to a housing with a metal plate and screws, using custom formed bolts, press fitting a bearing into a housing, and securing bearings with an adhesive.

As can be appreciated, electric motors of the type contemplated for use with the present invention generally need repairing from time to time. Typically, for example, bearings need replacing, shafts need reworking or replacing, and any number of internal electrical components may need fixing or replacing. When disassembling a motor for repair, it is sometimes necessary or desirable to remove a bearing from a motor end frame. The bearing lock devices of the prior art all present problems with efficiently removing a bearing from an end frame.

In addition to being able to efficiently repair a motor by disassembling a bearing from an end frame, ease of assembly is also of concern. The prior art bearing lock mechanisms present various problems in terms of assembly.

Using a metal plate to unlock a bearing from an end frame generally requires completely unscrewing the plate from the end frame. Since the metal plate is removed from the end frame, parts may be lost or misplaced, preventing efficient reassembly of the bearing onto the motor end frame. Affixing a metal plate to an end frame in order to lock a bearing in place requires that the bearing first be installed in the end frame and then the metal plate is positioned over the bearing. The plate and bearing must be held in place as screws fasten the plate to the end frame.

Using custom formed bolts generally requires the use of special tools in order to install and remove the bolts, such tools being known to those skilled in the art. If the appropriate tools are not readily available, installing or removing a bearing from an end frame may be delayed. Additionally, when using custom made bolts, the bolts must be specially made and the end frame must be properly formed to accommodate the custom bolts.

To remove a bearing that has been press fit into an end frame, either the bearing must be mechanically removed from the end frame, or the location where the bearing mates with the end frame must be heated or cooled, depending on the type of material used for the bearing and the end frame, in order to separate the bearing from the end frame. When press fitting a bearing into an end frame, special machinery and processes must be used, as known by those skilled in the art.

Removing a bearing that has been adhesively attached to an end frame generally destroys the adhesive. In order to return or replace the bearing, further adhesive must be appropriately applied. Securing a bearing with adhesive requires the use of a special adhesive capable of withstanding the environment of an electric motor, as known by those skilled in the art.

The prior art bearing lock devices and processes add unnecessary cost, complexity and time to the overall assembly of securing a bearing to an end frame.

Another prior art device which secures a bearing to an end bell of a motor is described in U.S. Pat. No. 2,772,929. In the '929 patent, dogs 62 engage stops 66 which are formed on the inner surfaces of a boss 52. Boss 52 must be properly aligned with the outer surface of bearing 22 in order for the dogs 62 to affix the bearing 22 in place. However, since stops 66 are formed on the boss 52, machining the boss to the proper dimension based on the width of the bearing is not possible. Thus, if boss 52 does not properly align with the outer surface of bearing 22 when bearing 22 is placed within boss 52, the boss cannot be easily machined to proper size. If the bearing 22 outside surface does not properly coincide with the top surface of boss 52, the bearing will not be properly fixed to the end bell, thereby possibly causing operational problems with the motor.

SUMMARY OF THE INVENTION

What is needed is a bearing lock assembly that is inexpensive to make, yet capable of locking a bearing in place. What is further needed is a bearing lock assembly that is easy to assemble. What is also needed is a bearing lock assembly that allows for efficient motor assembly, disassembly and repair.

The present invention provides a bearing lock clip for an electric motor. The bearing lock clip is secured to an end frame of the motor and fixes a motor bearing in place in the end frame. The bearing lock clip includes a tab designed to abut different portions of an outside surface of the end frame or the hub of the end frame at different times.

To lock a bearing to an end frame, the bearing lock clip is rotated, preferably by tightening the screw that secures the clip to the end frame, until the tab of the lock clip abuts a surface on the end frame. The bearing lock clip is designed such that, in this position, a part of the bearing lock clip is positioned over the outer surface of the bearing. The bearing lock clip is further tightened to the end frame while the tab continues to engage the surface of the end frame.

To unlock the bearing from the end frame, the bearing lock clip is rotated in the opposite direction (preferably by loosening the screw) until the tab abuts another surface on the end frame. The bearing lock clip is designed such that, in this position, no part of the bearing lock clip covers any part of the bearing. Thus, the bearing can be removed from or installed in the end frame.

Accordingly, a feature of the invention is to provide a bearing lock clip that is inexpensive to make and capable of locking or unlocking a bearing to an end frame of a motor.

Another feature of the invention is to provide a bearing lock clip that is easy to use and simplifies the process of attaching a bearing to an end frame. The bearing lock clip may be preassembled before inserting a bearing into an end frame and the bearing lock clip allows for a blind assembly.

A further feature of the invention is to provide a bearing lock assembly that allows for the capability of machining down a hub or surface of an end frame so that a bearing properly fits within the hub or end frame.

Other features and advantages of the invention will become apparent to those skilled in the art upon review of the following detailed description, claims and drawings.

Figure 1:
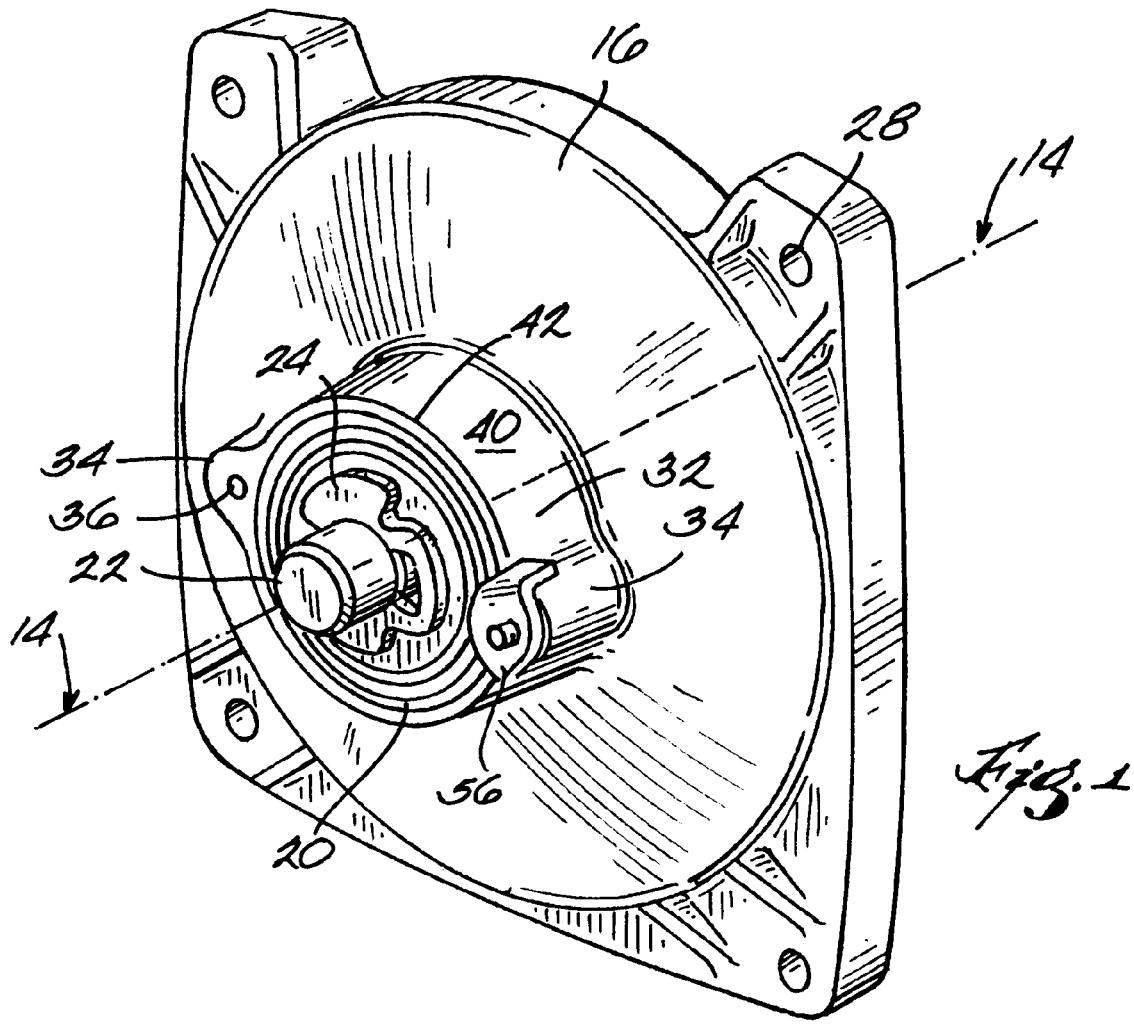
FIG. 1 is a perspective view of a motor end frame with a bearing lock clip according to the present invention.

Before one embodiment of the invention is explained in detail, it is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting.

DETAILED DESCRIPTION OF THE PREFERRED EMBODIMENTS

Figure 5:
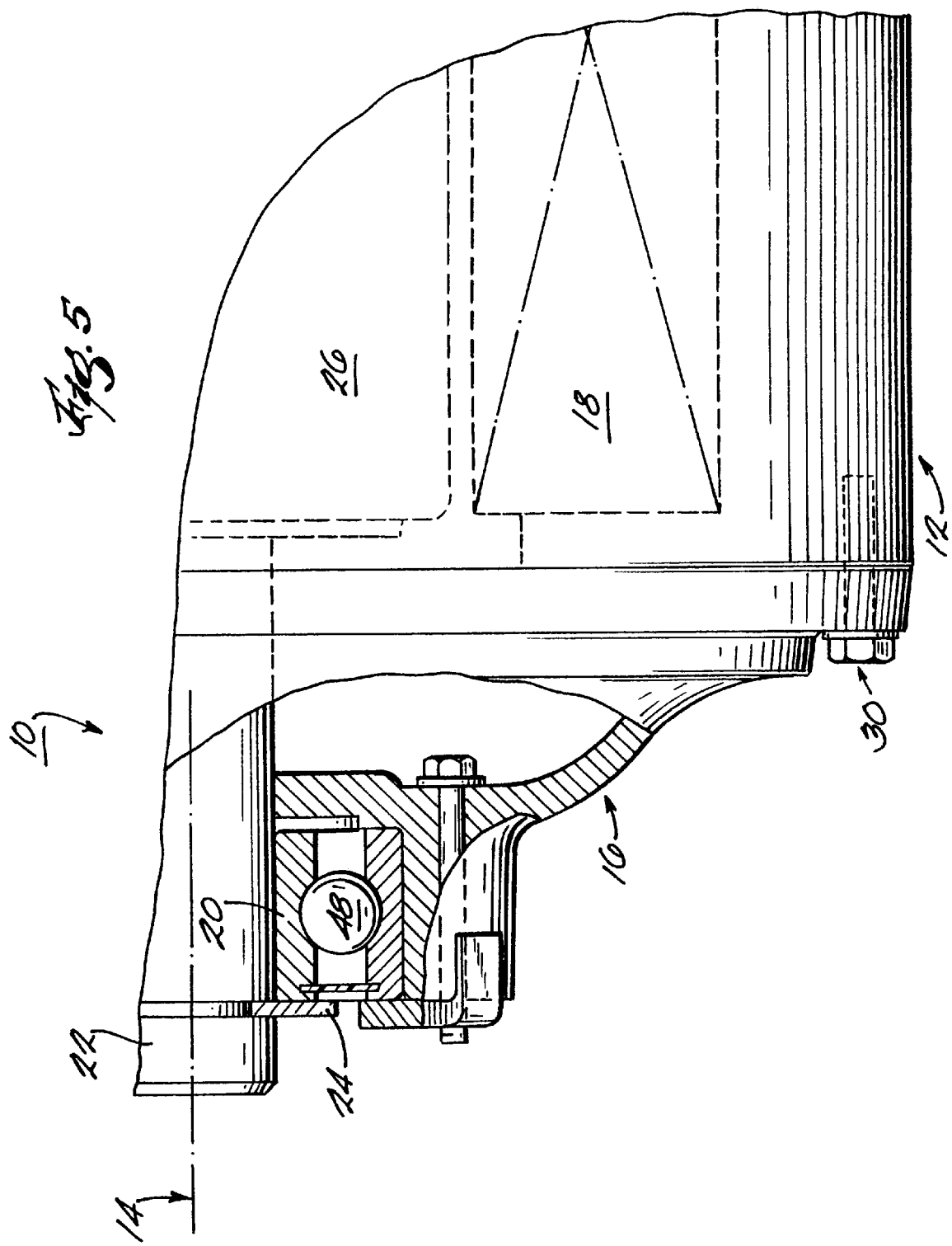
FIG. 5 is a partial side view, partially cut away, of the motor.

Illustrated in FIG. 5 is an electric motor 10 embodying the invention. The motor 10 comprises a housing 12 having an axis 14. The motor also comprises an end frame 16 mounted on the housing 12. While in the illustrated construction the end frame 16 is separate from the housing 12, in an alternative embodiment the housing 12 and the end frame 16 could be unitary. The motor also comprises a stator 18 supported by the housing 12 and fixed relative to the end frame 16. A bearing 20 is supported by the end frame 16. A rotor shaft 22 is supported by the bearing 20 for rotation about the axis 14. The bearing 20 is secured to the shaft 22 at least in part by retainer member 24. This is further explained below. A rotor 26 is supported by the shaft 22 for rotation therewith relative to the stator 18.

Figure 2:
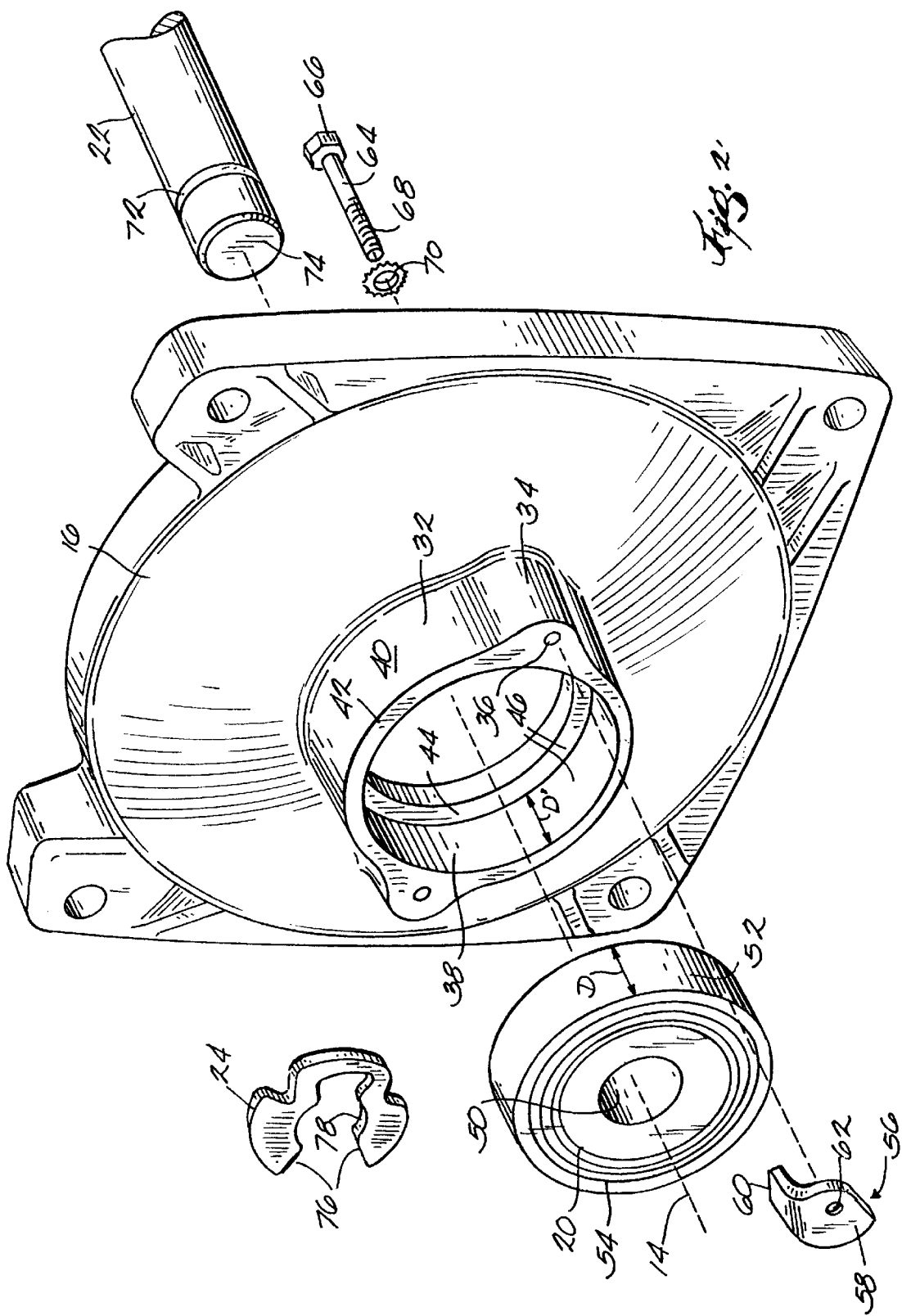
FIG. 2 is a partial exploded perspective view of an electric motor including the bearing lock clip of FIG. 1 showing the relationship between the bearing lock clip, a bearing and the motor end frame.

With reference to FIGS. 1 and 2, the motor end frame 16 has therethrough holes 28 through which bolts or screws 30 (shown only in FIG. 5) conventionally attach the motor end frame 16 to the motor housing 12. The end frame 16 has a hub 32. Hub 32 typically has at least one boss 34 extending therefrom. In the illustrated construction, the hub 32 has two bosses 34. Each boss 34 has extending therethrough a respective hole or aperture 36. The hub 32 includes a cylindrical inner surface 38, an outside surface 40, a top or end surface 42, and a shoulder 44 which extends inward from the inner surface 38 and which is spaced from and parallel to the end surface 42. The end surface 42 is substantially planar, devoid of any projections and is substantially perpendicular to axis 14. The outside surface 40 is generally perpendicular or generally transverse to the end surface 42 and surrounds the axis 14. Dimension D' is defined as the depth from the top or end surface 42 to the shoulder 44. Inner surface 38 is also generally perpendicular or generally transverse to the end surface 42 and surrounds the axis 14. Inner surface 38 includes shoulder 44 and defines a bearing seat 46.

The bearing 20 is seated in the bearing seat 46 and is thus supported by the end frame 16. Bearing 20 can be a number of different types of bearings but a roller contact bearing with ball bearings 48 (FIG. 5) is particularly suited for electric motors of the type contemplated to be used with the present invention. Bearing 20 includes an inside race 50, a cylindrical outer race 52, a top or outer surface 54, and a depth D in the direction of the axis 14.

A bearing lock clip 56 is secured to the end surface 42 of the hub 32 as further described below. Bearing lock clip 56 locks or unlocks bearing 20 to the motor end frame 16. Referring to FIG. 2, bearing lock clip 56 includes a main portion 58 and a tab portion 60 substantially perpendicular to the main portion 58. The function of tab 60 will be further explained in relation to the overall assembly of the components as described below. The main portion 58 has extending therethrough an eccentrically located or offset hole 62 that is preferably threaded. The bearing lock clip 56 may be made from any suitable material. Preferably, however, the bearing lock clip 56 is a single piece of aluminum or soft metal, manipulated into the appropriate shape.

With reference still to FIG. 2, the components are assembled as follows. Although the assembly is described in the following order, the overall steps in the assembly process may be performed in different order to achieve the final product as shown in FIG. 1.

Depth D of bearing 20 is measured. Once D is determined, the top or end surface 42 of hub 32 is machined down, if necessary, such that depth D measured from the shoulder 44 to the top surface 42 is substantially equal to depth D. Thus, when bearing 20 is placed within bearing seat 46, the outer surface 54 of bearing 20 is substantially co-planar with end surface 42 of motor end frame 16.

Bearing lock clip 56 is positioned on end surface 42 of hub 32 or boss 34 such that tab 60 is adjacent the outside surface 40 of end frame 16 and such that the main portion 58 of clip 56 abuts the end surface 42. A screw 64 secures clip 56 to end surface 42. The screw 64 has a head 66 and a threaded portion 68. Lock washer 70 is positioned around portion 68 of screw 64. Screw 64 is slid through hole 36 from the inside of end frame 16 with lock washer 70 between the screw head 66 and the end frame 16. Screw 64 is threaded into hole 62 of clip 56. In this way, the bearing lock clip 56 can be secured to the end frame 16 prior to positioning bearing 20 within the end frame 16.

Shaft 22 is attached to bearing 20 before bearing 20 is mounted on end frame 16, although bearing 20 could be attached to end frame 16 and then shaft 22 could be attached to bearing 20. The manner of connecting bearing 20 to shaft 22 is not significant. In the illustrated construction, shaft 22 has an annular groove 72 towards one end 74 of the shaft 22. End 74 of shaft 22 is slid through inner race 50 of bearing 20 until annular groove 72 extends past the outer surface 54 of bearing 20. Once groove 72 is properly positioned, retainer member 24 is snap fitted over groove 72 such that legs 76 of member 24 expand as member 24 is positioned over groove 72 and legs 76 snap back to their original position once the inside surface 78 of member 24 coincides with the surface of groove 72. Retainer member 24 prevents axial movement of shaft 22 with respect to bearing 20. It should be noted that shaft 22 is typically provided with a shoulder (not shown) which abuts the inside of bearing 20 to prevent axial movement in the other direction of shaft 22 with respect to bearing 20.

Figure 3:
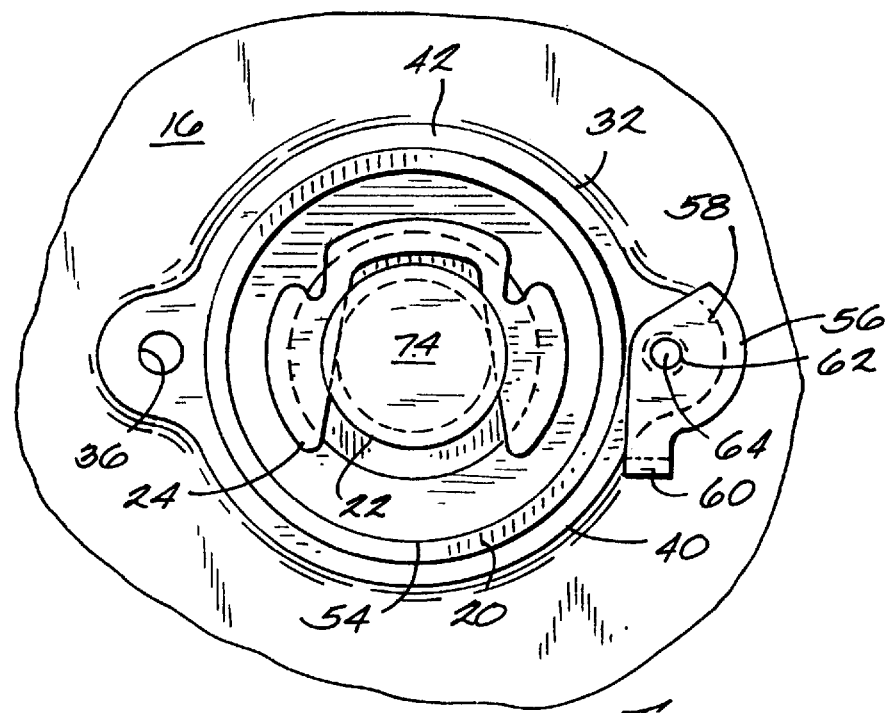
FIG. 3 is a partial end view of the motor showing the bearing lock clip in an unlocked position.
Figure 4:
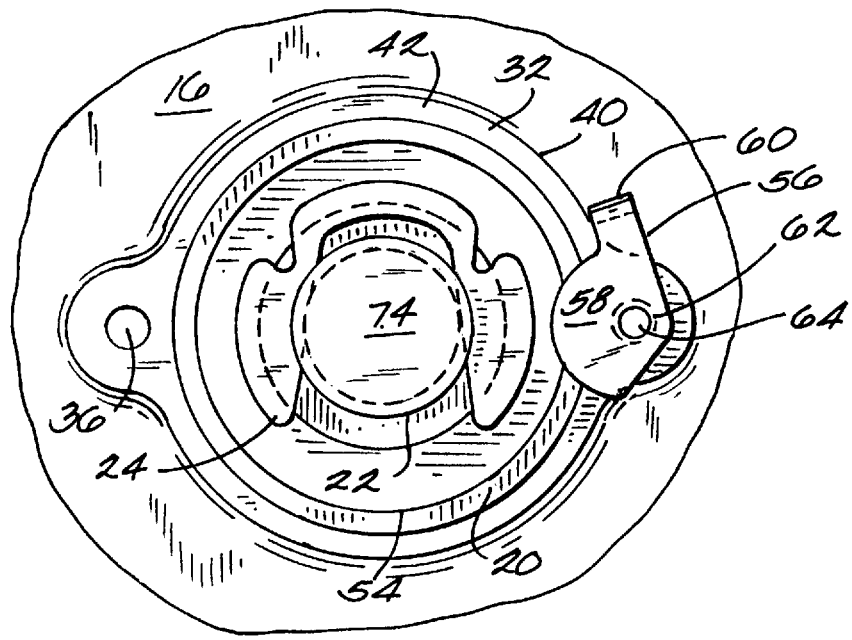
FIG. 4 is a partial end view of the motor showing the bearing lock clip in a locked position.

To further explain the present invention, reference is made to FIGS. 3 and 4 in conjunction with FIG. 2. Bearing lock clip 56 is mounted on end surface 42 for movement between a locked position (FIGS. 1 and 4) and an unlocked position (FIG. 3). Before bearing 20 is positioned within bearing seat 46, bearing lock clip 56 is placed in the unlocked position. With the clip 56 in the unlocked position, the clip 56 does not overlap the bearing seat 46 and the bearing 20 can be positioned into the bearing seat 46. When the clip 56 is in the unlocked position and the bearing 20 is in the bearing seat 46, no part of the bearing lock clip 56 covers or overlaps any part of the outer surface 54 of bearing 20, so that the bearing can be removed from the bearing seat 46. When the clip is in the unlocked position, tab 60 abuts a portion of the outside surface 40 as shown in FIG. 3. Engagement of the clip 56 by the surface 40 prevents movement of the clip 56 beyond the unlocked position, as further described below.

With the bearing lock clip 56 in the locked position, as shown in FIG. 4, a part of the main portion 58 covers or overlaps a portion of the outer surface 54 of bearing 20 so that bearing 20 is prevented from being removed from bearing seat 46. When the clip 56 is in the locked position, tab 60 abuts a portion of the outside surface 40 different from the portion that is engaged when the clip 56 is in the unlocked position. Engagement of the clip 56 by the surface 40 prevents movement of the clip 56 beyond the locked position, as further described below.

The locking clip 56, by virtue of being connected to screw 64, will naturally rotate with screw 64 as the screw is tightened or loosened. However, as tab 60 engages the surface 40 of end frame 16, the locking clip 56 will no longer rotate even if screw 64 is rotated further. To lock the bearing 20 in place (see FIG. 4), screw 64 is tightened, thereby rotating locking clip 56 until tab 60 abuts surface 40 and the clip is in the locked position. This prevents movement of the clip 56 beyond the locked position. The main portion 58 of clip 56 now overlaps the outer surface 54 of bearing 20. To unlock the bearing 20 or when installing the bearing 20 (see FIG. 3), screw 64 is loosened, thereby rotating locking clip 56 in the opposite direction until tab 60 abuts another part of the surface 40 so as to prevent movement of the clip 56 beyond the unlocked position. The clip 56 now does not overlap the outer surface 54 of bearing 20. In this position, locking clip 56 does not hinder removal or installation of bearing 20.

The foregoing description of the present invention has been presented for purposes of illustration and description. Furthermore, the description is not intended to limit the invention to the form disclosed herein. Consequently, variations and modifications commensurate with the above teachings, in skill or knowledge of the relevant art, are within the scope of the present invention. The embodiments described herein are further intended to explain best modes known for practicing the invention and to enable others skilled in the art to utilize the invention as such, or other embodiments and with various modifications required by the particular applications or uses of the present invention. It is intended that the appended claims are to be construed to include alternative embodiments to the extent permitted by the prior art.

Various features of the invention are set forth in the following claims.

What is claimed is:

1. An electric motor having an axis, said motor comprising:
   an end frame, said end frame including a hub, said hub including an end surface which is devoid of any projections and which is substantially perpendicular to the axis, said hub further including an inner surface which is generally transverse to said end surface and which defines a bearing seat;
   a bearing mounted in said bearing seat, said bearing having an outer surface substantially co-planar with said end surface of said hub;
   a bearing lock clip mounted on said end surface of said hub for movement between locked and unlocked positions, said clip being mounted on said end surface such that, when said clip is in said unlocked position, said clip does not overlap said outer surface of said bearing and said bearing can be installed into or removed from said bearing seat, and such that, when said clip is in said locked position, said clip overlaps said outer surface of said bearing in order to prevent said bearing from being removed from said bearing seat;
   a stator fixed relative to said end frame;
   a shaft supported by said bearing for rotation about the axis; and
   a rotor supported by said shaft for rotation therewith relative to said stator.

2. An electric motor according to claim 1, wherein said hub further includes an outside surface which is generally transverse to said end surface and which surrounds the axis, and wherein said bearing lock clip further includes a main portion abutting said end surface and a tab portion substantially perpendicular to said main portion, said clip being mounted on said end surface such that said tab is adjacent said outside surface of said hub, such that, when said clip is in said unlocked position, said tab abuts a portion of said outside surface so as to prevent movement of said clip beyond said unlocked position, and such that, when said clip is in said locked position, said tab abuts another portion of said outside surface so as to prevent movement of said clip beyond said locked position.

3. An electric motor according to claim 2 wherein said outside surface is substantially perpendicular to said end surface of said hub.

4. An electric motor according to claim 1, wherein said hub further includes an aperture which extends from said end surface and which is substantially parallel with said axis, and wherein said clip has therethrough a threaded aperture, said clip being mounted on said end surface by a screw extending through said aperture in said hub and into said threaded aperture of said clip, said clip being moved between said locked and unlocked positions by tightening or loosening said screw.

5. An electric motor according to claim 4 wherein said aperture is eccentrically located.

6. An electric motor according to claim 1, further comprising a housing, wherein said end frame is mounted on said housing and wherein said stator is supported by said housing.

7. An electric motor having an axis, said motor comprising:
   an end frame, said end frame including a hub, said hub including an end surface which is substantially perpendicular to the axis, said hub further including an outside surface which is generally transverse to said end surface and which surrounds the axis, said hub further including an inner surface which is generally transverse to said end surface and which defines a bearing seat;
   a bearing mounted in said bearing seat, said bearing having an outer surface substantially co-planar with said end surface of said hub;
   a bearing lock clip mounted on said end surface for movement between locked and unlocked positions, said clip including a main portion abutting said end surface, and said clip also including a tab portion substantially perpendicular to said main portion, said clip being mounted on said end surface such that said tab is adjacent said outside surface of said hub, such that, when said clip is in said unlocked position, said tab abuts a portion of said outside surface so as to prevent movement of said clip beyond said unlocked position, said main portion of said clip does not overlap said outer surface of said bearing, and said bearing can be installed into or removed from said bearing seat, and such that, when said clip is in said locked position, said tab abuts another portion of said outside surface so as to prevent movement of said clip beyond said locked position, and said main portion of said clip overlaps said outer surface of said bearing in order to prevent said bearing from being removed from said bearing seat;

a stator fixed relative to said end frame;

a shaft supported by said bearing for rotation about the axis; and a rotor supported by said shaft for rotation therewith relative to said stator.

8. An electric motor according to claim 7 wherein said outside surface is substantially perpendicular to said end surface of said hub.

9. An electric motor according to claim 7, wherein said hub further includes an aperture which extends from said end surface and which is substantially parallel with said axis, and wherein said main portion has therethrough a threaded aperture, said clip being mounted on said end surface by a screw extending through said aperture in said hub and into said threaded aperture of said clip, said clip being moved between said locked and unlocked positions by tightening or loosening said screw.

10. An electric motor according to claim 9 wherein said aperture is eccentrically located.

11. An electric motor according to claim 7, further comprising a housing, wherein said end frame is mounted on said housing and wherein said stator is supported by said housing.

12. An electric motor comprising:

a housing having an axis;

a stator supported by said housing;

an end frame mounted on said housing, said end frame including a hub, said hub including a substantially planar end surface which is devoid of any projections and which is substantially perpendicular to said axis, said hub further including an outside surface which is generally perpendicular to said end surface and which surrounds said axis, said hub further including an inner surface which is generally perpendicular to said end surface, which surrounds said axis and which defines a bearing seat, and said hub further including an aperture which extends from said end surface and which is substantially parallel with said axis;

a bearing mounted in said bearing seat, said bearing having an outer surface substantially co-planar with said end surface of said hub;

a bearing lock clip mounted on said end surface for movement between locked and unlocked positions, said clip including a main portion abutting said end surface and having therethrough an eccentrically located threaded aperture, and said clip also including a tab portion substantially perpendicular to said main portion, said clip being mounted on said end surface by a screw extending through said aperture in said hub and into said threaded aperture of said clip, said clip being moved between said locked and unlocked positions by tightening or loosening said screw, said clip being mounted on said end surface such that said tab is adjacent said outside surface of said hub, such that, when said clip is in said unlocked position, said tab abuts a portion of said outside surface so as to prevent movement of said clip beyond said unlocked position, said main portion of said clip does not overlap said outer surface of said bearing, and said bearing can be installed into or removed from said bearing seat, and such that, when said clip is in said locked position, said tab abuts another portion of said outside surface so as to prevent movement of said clip beyond said locked position, and said main portion of said clip overlaps said outer surface of said bearing in order to prevent said bearing from being removed from said bearing seat;

a shaft supported by said bearing for rotation about said axis; and a rotor supported by said shaft for rotation therewith relative to said stator.

* * * * *